United States Patent
Huang et al.

(10) Patent No.: US 9,483,748 B2
(45) Date of Patent: Nov. 1, 2016

(54) RFID ENABLED DYNAMIC OBJECT VERIFICATION WITH GTIN DECODED FROM EPC

(76) Inventors: Qiming Huang, Palo Alto, CA (US); Christopher Rusnak, Waldwick, NJ (US)

( * ) Notice: Subject to any disclaimer, the term of this patent is extended or adjusted under 35 U.S.C. 154(b) by 275 days.

(21) Appl. No.: 12/247,827

(22) Filed: Oct. 8, 2008

(65) Prior Publication Data
US 2010/0084463 A1    Apr. 8, 2010

(51) Int. Cl.
*G06Q 10/00* (2012.01)
*G06Q 10/08* (2012.01)

(52) U.S. Cl.
CPC ............ *G06Q 10/08* (2013.01); *G06Q 10/087* (2013.01)

(58) Field of Classification Search
USPC .......... 235/375, 385, 492; 705/22, 330, 337, 705/28
See application file for complete search history.

(56) References Cited

U.S. PATENT DOCUMENTS

| | | | |
|---|---|---|---|
| 7,012,529 B2 * | 3/2006 | Sajkowsky | 340/572.1 |
| 7,233,958 B2 * | 6/2007 | Weng et al. | 707/693 |
| 7,962,096 B2 * | 6/2011 | Cox | 455/41.2 |
| 2002/0099567 A1 * | 7/2002 | Joao | 705/1 |
| 2002/0120533 A1 * | 8/2002 | Wiesenmaier | 705/27 |
| 2005/0256798 A1 * | 11/2005 | Herter et al. | 705/37 |
| 2006/0181397 A1 * | 8/2006 | Limbachiya | 340/10.51 |
| 2006/0247986 A1 * | 11/2006 | Joao | 705/28 |
| 2006/0253343 A1 * | 11/2006 | Gregersen et al. | 705/27 |
| 2007/0038673 A1 * | 2/2007 | Broussard et al. | 707/104.1 |
| 2007/0126578 A1 * | 6/2007 | Broussard | 340/572.1 |

OTHER PUBLICATIONS

Brock, David L., Integrating the Electronic Product Code (EPC) and the Global Trade Item Number (GTIN), Nov. 1, 2001.*

* cited by examiner

*Primary Examiner* — Allyson Trail
(74) *Attorney, Agent, or Firm* — Precision IP

(57) ABSTRACT

Electronic Product Codes (EPCs) can be read from RFID labels and tags to verify shipments. The EPCs are decoded to Global Trade Item Numbers (GTINs), which are then matched to GTINs of products on a shipping list. If all of the decoded GTINs match and there are no GTINs in the shipment list that are left unmatched, then shipment verification is successful. If some of the decoded GTINs fail to match, the verification process fails with extra, unexpected products. If some of the GTINs in the shipping list are left unmatched, the verification process fails with the missing products.

18 Claims, 7 Drawing Sheets

RFID ENABLED DYNAMIC OBJECT VERIFICATION WITH GTIN DECODED FROM EPC

BACKGROUND OF THE INVENTION

The present invention relates to industrial automation. More specifically, the present invention relates to RFID enabled dynamic object verification with GTIN decoded from EPC.

Traditionally in logistics operations, an object (e.g., a case or box or pallet) is uniquely identified by a license plate number (LPN). The LPN is normally printed on the object in a barcode format. For each LPN, a record needs to be stored in a logistics database table for mapping this unique number to a product type control number, also known as a Global Trade Item Number (GTIN). During shipping, each object loaded onto a truck container will need to be barcode scanned and verified against the product types on the shipment list. Additionally, the mapping between the unique IDs and the product types has to be preceded in the logistics database table. In this scenario, the verification process read in the unique IDs and retrieves the GTINs for them from the logistics database table. Then the GTINs are used for matching the GTINs on the shipment list.

In recent years, Radio Frequency Identification (RFID) technology is used for identifying the objects in logistics operations. Normally a unique ID is stored in an RFID tag, and then the RFID tag is applied to the object. When multiple objects within the proximity of an RFID reader antenna, the unique IDs associated with the objects are captured and sent to the logistics software system for verification. This process generally improves the efficiency of data collection at shipping time.

In one example, the unique IDs need to be assigned to the shipment objects. If each object in the shipment list is already associated with a unique ID that is specific to the case, when the case unique ID is read during the loading process, the unique ID can be used to match the unique ID in the shipment list. However, this verify-by-unique ID process requires the case pickup to be very accurate. In other words, each case to be picked up for shipment is required to have the exact unique IDs on the shipment list. A pickup worker cannot just load any ten cases of tomato soup for shipment, but must load those exact ten cases identified in the shipping list. Finding the right product items by a pickup worker from their numbers can be extremely difficult and prohibitive.

For the above example to work, often, however, the unique IDs are generated at the factory where it may be unknow to which manufacturer's warehouse a given product is destined. Therefore, it has been difficult to provide such a mapping between the unique ID generated at the factory and the unique ID associated with a shipment at the warehouse.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

The present invention relates to industrial automation. More specifically, the present invention relates to RFID enabled dynamic object verification with GTIN decoded from EPC.

In various embodiments, Electronic Product Codes (EPCs) can be read from RFID labels and tags to verify shipments. The EPCs are decoded to Global Trade Item Numbers (GTINs), which are then matched to GTINs of products on a shipping list. If all of the decoded GTINs match and there are no GTINs in the shipment list that are left unmatched, then shipment verification is successful. If some of the decoded GTINs fail to match, the verification process fails with extra, unexpected products. If some of the GTINs in the shipping list are left unmatched, the verification process fails with the missing products.

In one embodiment, techniques are provided for verifying product shipments. A first identifier associated with a tag may be received. A second identifier may be determined from the first identifier. A determination may be made whether a product identified in a shipment list is physically present based on the second identifier. Information can then be generated indicative of presence of the product. The second identifier may be determined from an Electronic Product Code (EPC). A Global Trade Item Number (GTIN) may be determined from the first identifier.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
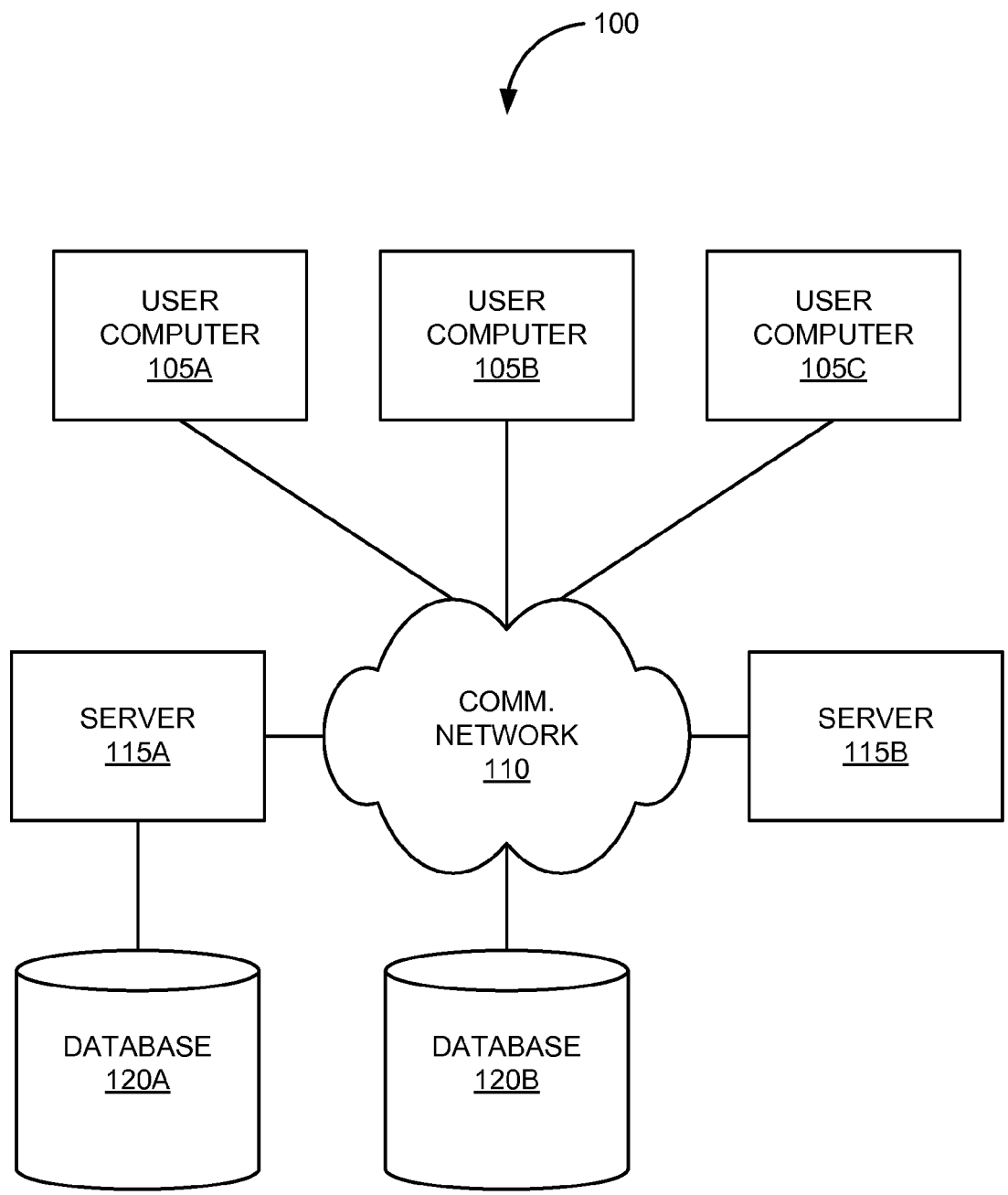
FIG. 1 is a block diagram of a system that may incorporate embodiments of the present invention.

FIG. 1 is a simplified illustration of system 100 that may incorporate embodiments of the present invention. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 105 (e.g., computers 105A, 105B, and 105C). User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., communications network 110 described below) and/or displaying and navigating web pages or other types of electronic documents. Although the exemplary system 100 is shown with three user computers, any number of user computers can be supported.

Certain embodiments of the invention operate in a networked environment, which can include a communications network 110. Communications network 110 can be any type of network familiar to those skilled in the art that can support data communications using any of a variety of commercially-available protocols, including without limitation TCP/IP, SNA, IPX, AppleTalk, and the like. Merely by way of example, communications network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115A and 115B). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one ore more file and or/application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to a user computer 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on a user computer 105 and/or another server 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120A and 120B). The location of the database(s) 120 is discretionary: merely by way of example, a database 120A might reside on a storage medium local to (and/or resident in) server computer 115A (and/or one or more of user computers 105). Alternatively, a database 120B can be remote from any or all of user computers 105 and server computers 115, so long as it can be in communication (e.g., via communications network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle database, that is adapted to store, update, and retrieve data in response to SQL-formatted commands. Databases 120 might be controlled and/or maintained by a database server, as described above, for example.

Figure 2:
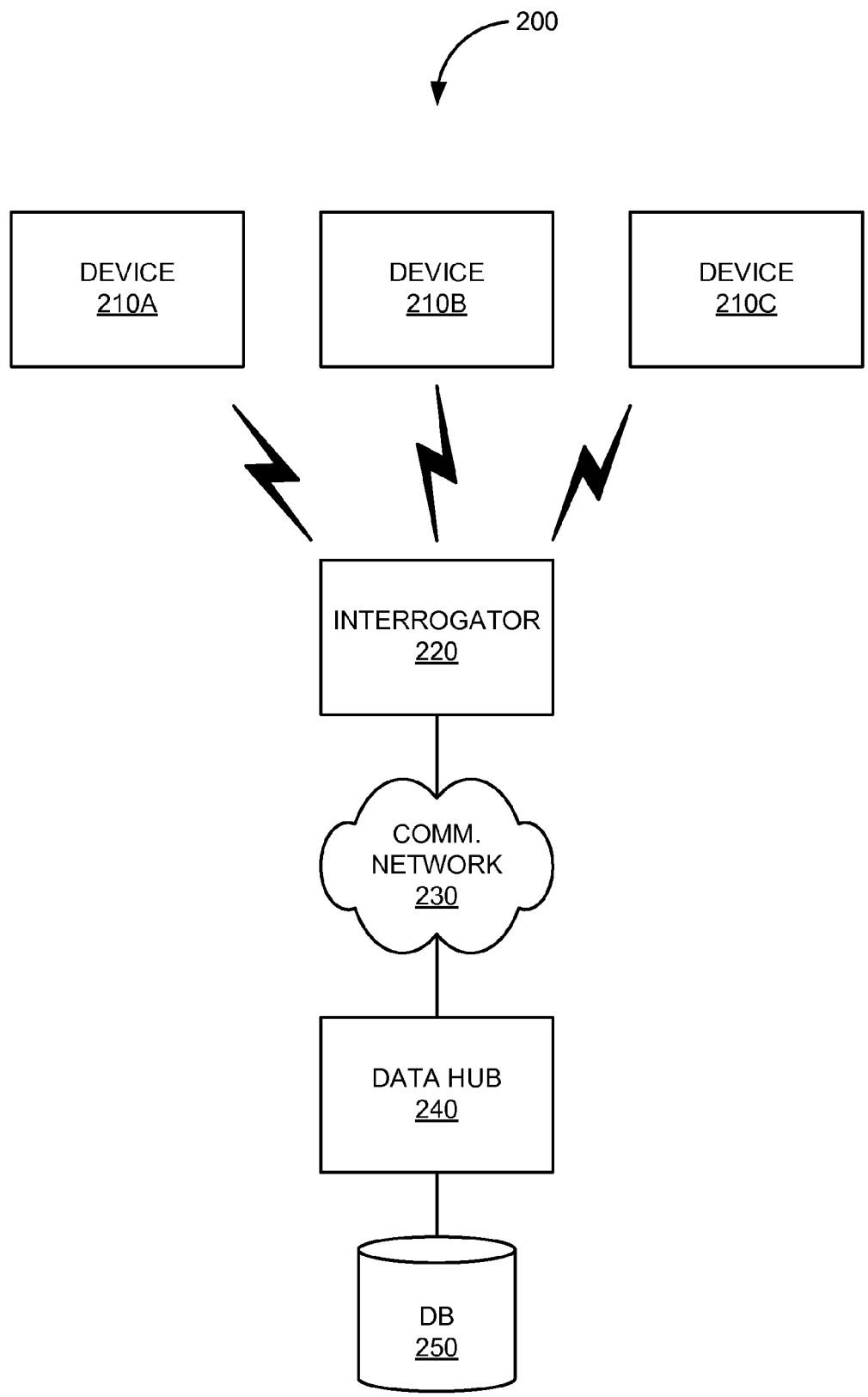
FIG. 2 is a block diagram of a system for provided shipment verification in one embodiment according to the present invention.

FIG. 2 is a block diagram of system 200 for providing shipment verification in one embodiment according to the present invention. In this example, system 200 includes devices 210 (e.g., devices 210A, 210B, and 210B). In general, information may be read or otherwise collected from devices 210. In some embodiments, devices 210 can be sensors that provide telemetry data, temperature sensors, humidity sensors, pressure sensors, voltage sensors, contactless cards, RFID tags and labels, devices that include barcodes, and the like.

In certain embodiments, data is collected from devices 210, such as an RFID label, using interrogator 220. Interrogator 220 is any hardware and/or software elements that collect data from devices 210. Interrogator 220 may be a fixed or mobile RFID reader. In various embodiments, interrogator 220 communicates data collected from devices 210 using communications network 230 to data hub 240.

Communications network 230 can be any type of network familiar to those skilled in the art that can support data communications using any of a variety of commercially-available protocols, including without limitation TCP/IP, SNA, IPX, AppleTalk, and the like. Merely by way of example, communications network 230 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

In various embodiments, data hub 240 is coupled to database 250. Data hub 240 is any hardware and/or software elements that receive data from interrogator 220. Data hub 240 may provide middleware and/or application support to access data stored in database 250. One example of data hub 240 is a server running Oracle Sensor Edge Server provided by Oracle Corp. of Redwood Shores, Calif. Some examples of database 250 are files, flat database, relational databases, and the like.

In operation, when devices 210 enter within the proximity of interrogator 220, devices 210 transmit data to interrogator 220. For example, device 210A may be a passive RFID label, an antenna (not shown) associated with interrogator 220 may energize circuitry of the passive RFID label such that the RFID label transmits data stored in a memory. In another example, device 210B may be an active RFID tag that continuously broadcasts data which may be intercepted by interrogator 220. Interrogator 220 then forwards the data to data hub 240. Data hub 240 may store the data in database 250. In some embodiments, data hub 240 processes the data, and formats into events.

In various embodiments, Electronic Product Codes (EPCs) can be read from devices 210 to verify shipments. For example, devices 210 may be RFID labels or tags applied to products or product packaging. Each RFID label or tag may be "printed" with the EPC for the product or package (e.g., the box or case). In general, EPC tag data standards are defined by EPCglobal for encoding a globally unique ID by combining a product type Global Trade Item Number (GTIN) and a serial number. For objects of the same product type, they generally share the same GTIN. However, the serial number for each of the objects is different. Thus, the EPC IDs are unique across individual products or product packaging.

EPC tag data standards also define a decoding method for decoding the unique EPC ID to the product type GTIN of the object. For objects of the same product type, the EPC IDs are typically decoded to the same GTIN. Thus, in some embodiments, the EPCs read from the RFID labels are then decoded to GTIN. The decoded GTINs are then matched to GTINs of products on a shipping list. If all of the decoded GTINs match and there are no GTINs in the shipment list that are left unmatched, then shipment verification is successful. If some of the decoded GTINs fail to match, the verification process fails with extra unexpected products. If some of the GTINs in the shipping list are left unmatched, the verification process fails with the missing products.

Accordingly, shipments of items can be dynamically verified. As a result, the unique EPCs provided at the manufacturer do not have to be known to those in the supply chain. Additionally, a pickup worker can select any products or items to fulfill a shipping order, and the shipment list will be dynamically verified by decoding the EPCs to their respective GTINs.

Figure 3:
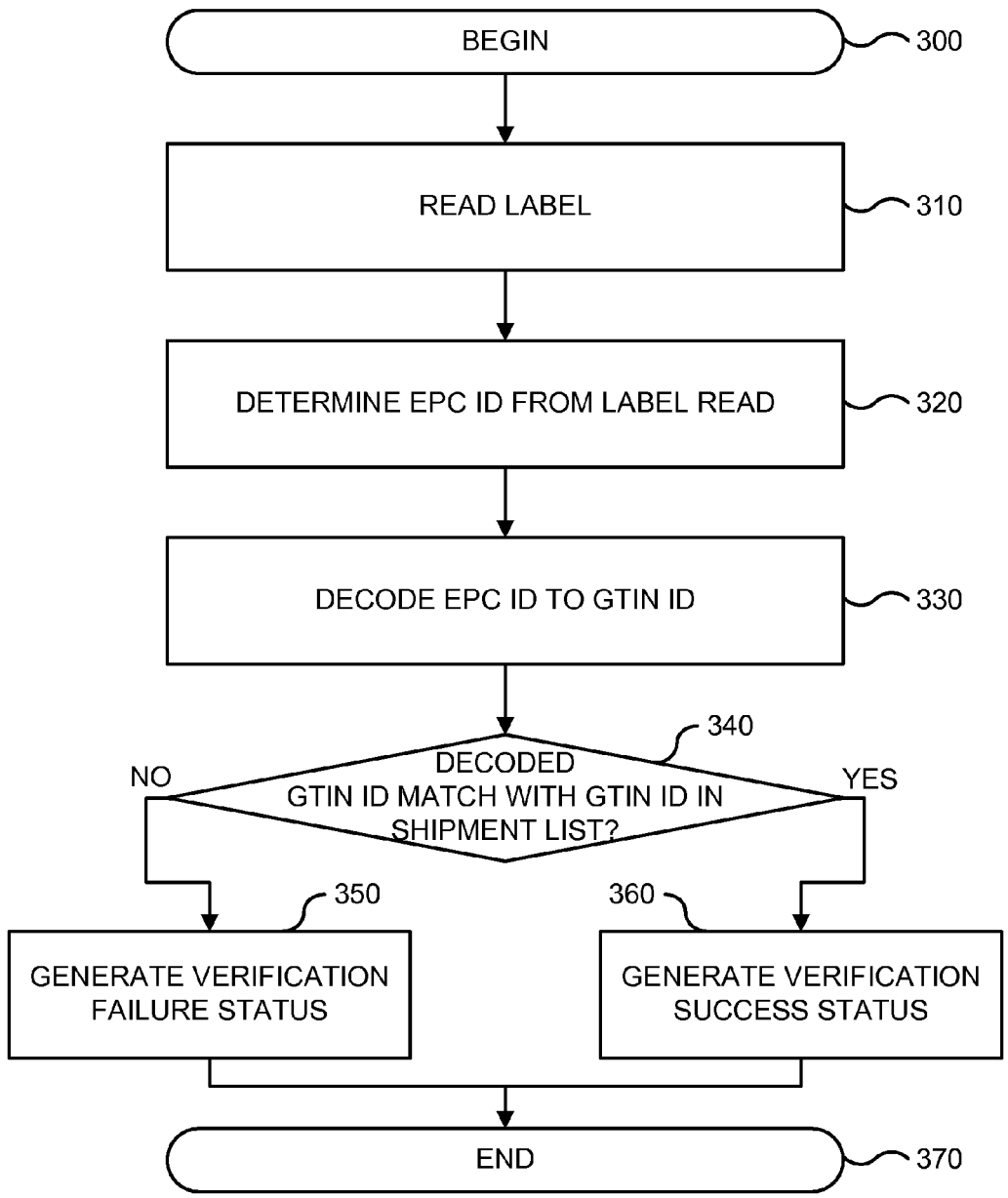
FIG. 3 is a flowchart of a method for shipment verification in one embodiment according to the present invention.

FIG. 3 is a flowchart of a method for shipment verification in one embodiment according to the present invention. The processing depicted in FIG. 3 may be performed by software modules (e.g., instructions or code) executed by a processor of a computer system, by hardware modules of the computer system, or combinations thereof. FIG. 3 begins in step 300.

In step 310, a label is read. For example, interrogator 220 of FIG. 2 may remotely read an RFID tag or label and receive a sequence of bits. In step 320, an EPC ID is determined from the label read.

In step 330, the EPC ID is decoded to a GTIN ID. In step 340, a determination is made whether the decoded GTIN ID matches with a GTIN ID in a shipment list.

If no match is found in the determination of step 340, a verification failure status is generated in step 350. In one example, a notification indicative of the missing product is generated and displayed. The notification may also be sent to an application or user.

If the match is found in the determination of step 340, a verification success status is generated in step 360. For example, a notification indicating that the product is physically present may be generated and displayed. FIG. 3 ends in step 370.

Figure 4:
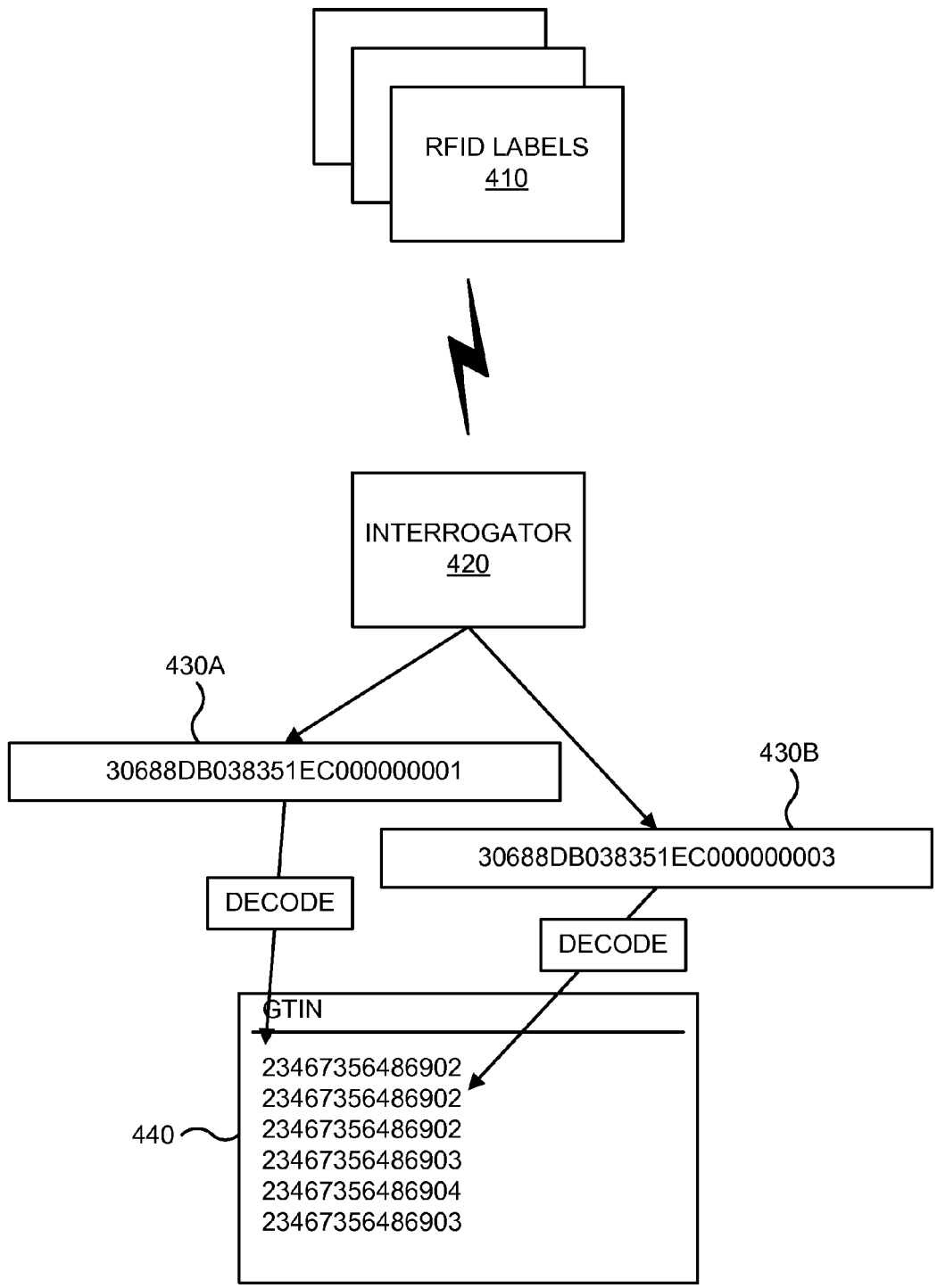
FIG. 4 is a block diagram illustrating decoding of RFID labels in one embodiment according to the present invention.

FIG. 4 is a block diagram illustrating decoding of RFID labels in one embodiment according to the present invention. In this example, a set of RFID labels 410 are remotely read by interrogator 420. Interrogator 420 obtains identifiers 430 from the set of RFID labels 420.

For example, at the end of a manufacturing cycle at an original equipment manufacturer (OEM) factory, cases of product A with GTIN number of "23467356486902" are applied with the set of RFID labels 410. The set of RFID labels are written with identifiers 430 (e.g., EPC IDS), such as:

30688DB038351EC000000001
30688DB038351EC000000002
30688DB038351EC000000003
30688DB038351EC000000004
30688DB038351EC000000005

In various embodiments, the last nine and half hexadecimal digits, or the last 38 binary digits of identifiers 430 are serial numbers which ensure the uniqueness of each EPC ID even for the same product type. Because the EPC IDs are written by the OEM, they may not be stored in the logistics management database of a supplier or retailer and certainly not available to a shipment system of the supplier or retailer.

In this example, shipment list 440 includes three cases of product A with GTIN value of "23467356486902." Other products may be included in shipments list 440, such as two items with GTIN value of "23467356486903" and one item with GTIN value of "23467356486904." During the shipment loading, any three cases of the product A are picked up and loaded onto a truck or container.

When the cases are moved through RFID reader antennas, such as onboard the truck or at the doors of a dock, the EPC IDs of the three cases are read and passed to a shipment verification program. The shipment verification program dynamically decodes each EPC ID to get the product type GTIN of "23467356486902." The decoded GTIN of "23467356486902" of the three cases are matched to the cases on the shipment list with the same GTIN value of 23467356486902.

Figure 5:
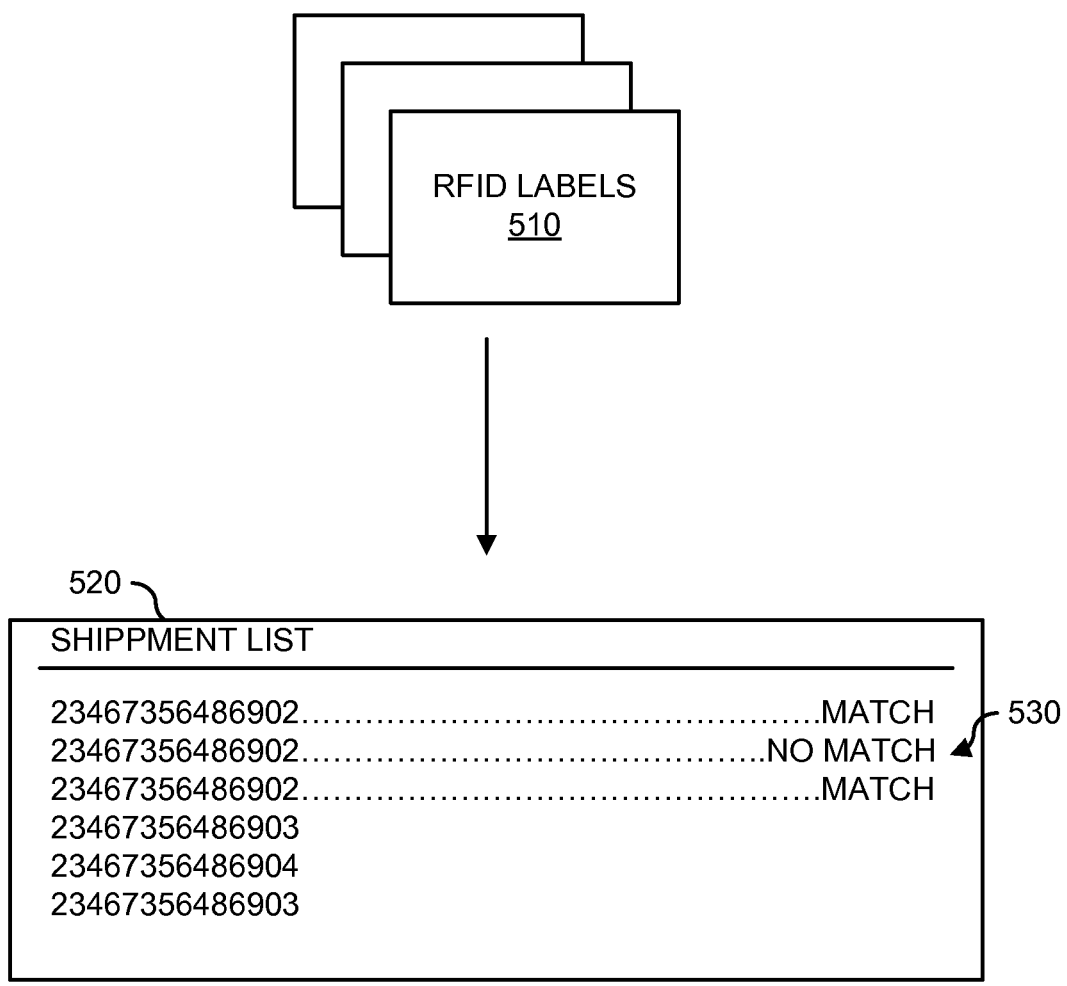
FIG. 5 is a block diagram illustrating matching between RFID labels and a shipment list in one embodiment according to the present invention.

FIG. 5 is a block diagram illustrating matching between RFID labels and a shipment list in one embodiment according to the present invention. In this example, a set of RFID labels 510 are read, and the EPC IDs are decoded to product type GTIN. The decoded GTIN are matched to items listed on shipment list 520.

In various embodiments, status indicators 530 are generated and displayed indicative of whether a decoded GTIN is matched. For example, a read from the set of RFID labels 510 may result in matches with 2 out of three cases of product A. For the two cases of product A that were found, a "MATCH" or found indicator may be generated and displayed. For the single case of product A that was not physically present or otherwise found, a "NO MATCH" or not found indicator may be generated and displayed.

Figure 6:
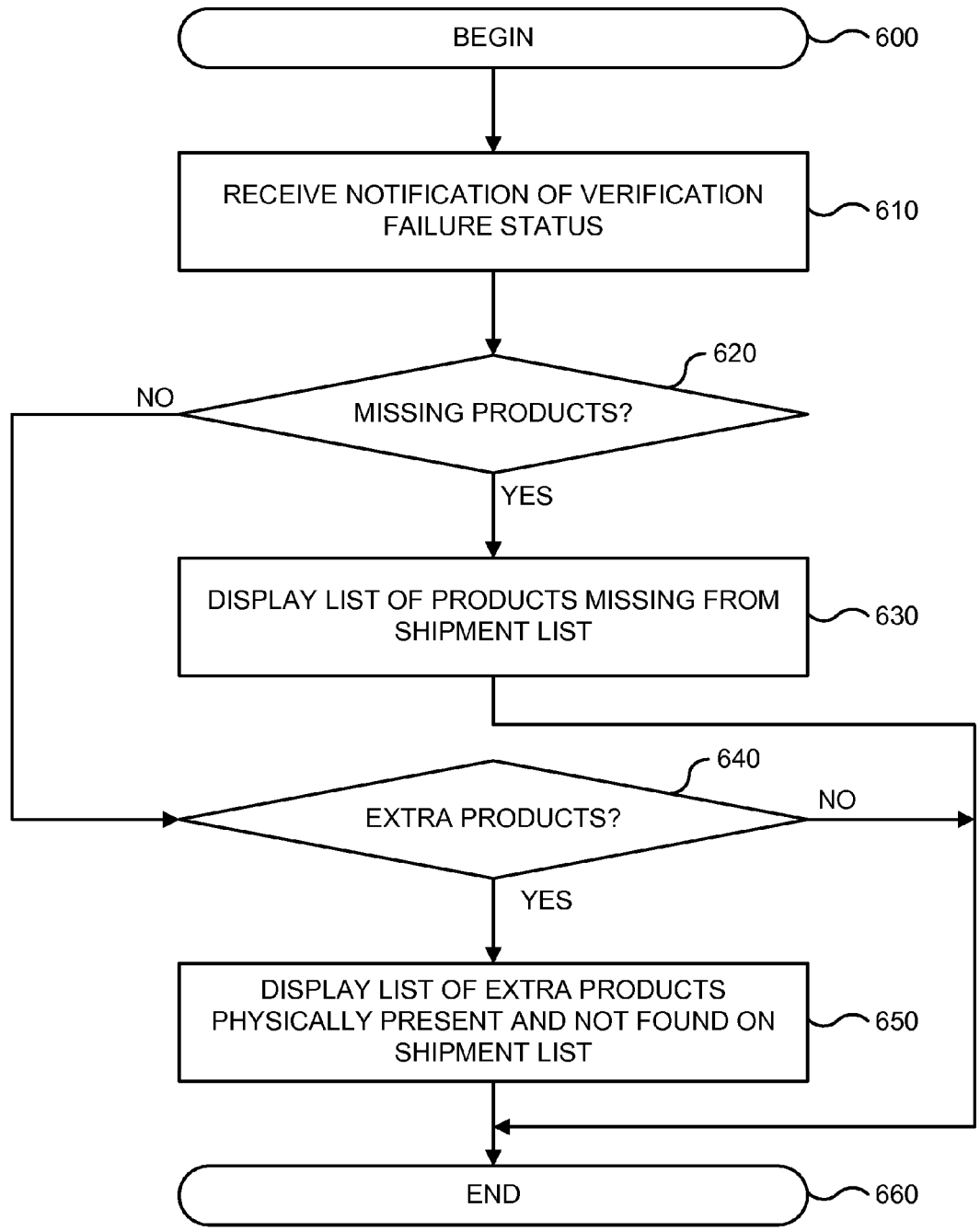
FIG. 6 is a flowchart of a method for displaying results of a dynamic shipment verification process in one embodiment according to the present invention.

FIG. 6 is a flowchart of a method for displaying results of a dynamic shipment verification process in one embodiment according to the present invention. FIG. 6 begins in step 600.

In step 610, a notification of verification failure status is received. In step 620, a determination is made whether one or more products are missing from a shipment list. For example, a shipment verification system may mark or otherwise flag a product in the shipment list when a matching decoded GTIN is received. The shipment verification system may then determine whether any items in the shipment list have not been marked or flagged to determine whether items are missing from the shipment list.

If one or more products are determined to be missing from the shipment list in step 620, a list of products missing from the shipment list are displayed in step 630. For example, the shipment verification system may display a list of those items that have not been marked or flagged.

If one or more products are not determined to be missing from the shipment list in step 620, a determination is made whether one or more extra products are included in the shipment in step 640. If one or more extra products are determined to be included in the shipment in step 640, a list of the one or more extra products physically present and not found on the shipment list are displayed in step 650. FIG. 6 ends in step 660.

Accordingly, shipment verification may be provided that utilizes RFID technology for reading multiple cases without human interference. The loading velocity and efficiency are also greatly improved with less human resources required. Moreover, EPC ID encoding/writing, RFID label applying, and shipment verification can happen at the different locations using disconnected systems, which is true in many supply chain situations.

In various embodiments, the precise result of successful status or erroneous status with problematic case EPC IDs are reported. Therefore, the dynamic verification of shipments improves the efficiency, accuracy, and flexibility of the shipping process. Additionally, embodiments can be applied to receiving processes, storing processes, and any grouping process in logistics and supply chain management.

Figure 7:
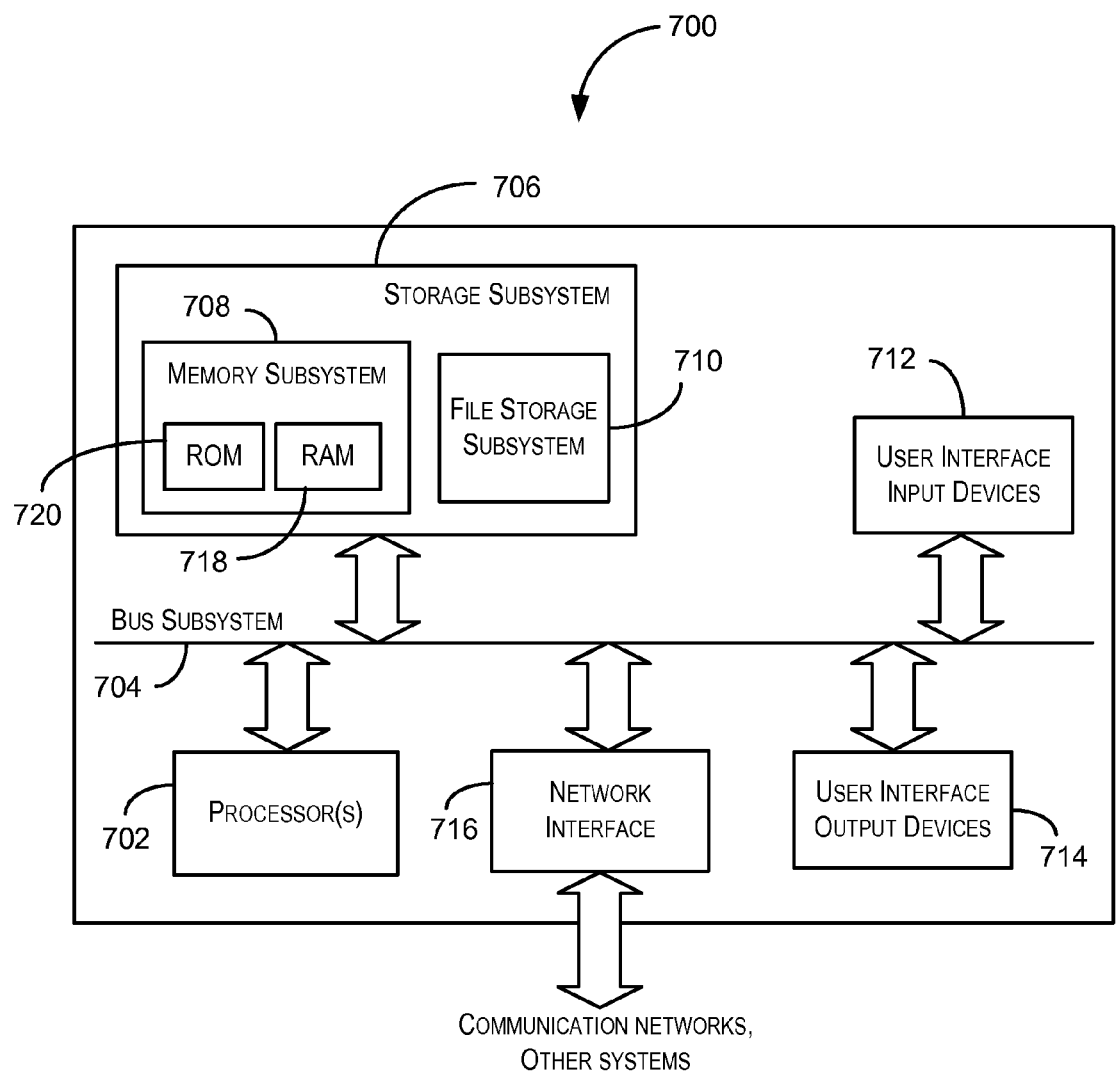
FIG. 7 is a block diagram of a computer system that may be used to practice embodiments of the present invention.

FIG. 7 is a simplified block diagram of a computer system 700 that may be used to practice embodiments of the present invention. As shown in FIG. 7, computer system 700 includes a processor 702 that communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716.

Bus subsystem 704 provides a mechanism for letting the various components and subsystems of computer system 700 communicate with each other as intended. Although bus subsystem 704 is shown schematically as a single bus, alternative embodiments of the bus subsystem may utilize multiple busses.

Network interface subsystem 716 provides an interface to other computer systems, and networks, and devices. Network interface subsystem 716 serves as an interface for receiving data from and transmitting data to other systems from computer system 700.

User interface input devices 712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

User interface output devices 714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 may be configured to store the basic programming and data constructs that provide the functionality of the present invention. Software (code modules or instructions) that provides the functionality of the present invention may be stored in storage subsystem 706. These software modules or instructions may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 700 can be of various types including a personal computer, a portable computer, a workstation, a network computer, a mainframe, a kiosk, or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for verifying individual items during loading into a container by a pickup worker of a shipper, the method comprising:
    at a computer system of the pickup worker, the computer system having a display device, a processor, and a memory, the memory storing an electronic shipping list associated with a shipment, wherein the electronic shipping list itemizes each of a plurality of individual items forming the shipment according to product type using at least a Global Trade Item Number (GTIN), wherein the electronic shipping list exists independently of a list of items loaded into the container, and wherein the electronic shipping list specifies items to be shipped prior to any items being loaded into the container:
        generating a user interface at the display device that indicates whether individual items in the electronic shipping list are present in the container, at least one of the individual items in the electronic shipping list indicated to not be present in the container;
        receiving information read from a tag affixed to an item by one or more tag reading devices associated with the container in response to the pickup worker of the shipper loading the item into the container, wherein the information read comprises a unique identifier associated with the item;
        in response to receiving the information read from the tag affixed to the item, decoding the unique identifier to obtain a Global Trade Item Number (GTIN) that uniquely identifies a product type of the item;
        determining, on an item by item basis, that the GTIN of the item matches the GTIN in the electronic shipping list of one of the at least one of the individual items indicated to not be present in the container; and
        modifying the user interface at the display device to indicate that the one of the at least one of the individual items indicated to not be present in the container is present in the container.

2. The method of claim 1 wherein the unique identifier is an Electronic Product Code (EPC) stored in the tag affixed to the item.

3. The method of claim 1 further comprising:
    generating one or more notifications indicating that one or more individual items in the shipment are physically present.

4. The method of claim 1 further comprising:
    generating one or more notifications indicating that one or more individual items in the shipment are not physically present.

5. The method of claim 1 further comprising:
    determining, on an item by item basis, whether the GTIN of the item indicates presence of an item not itemized in the electronic shipping list associated with a shipment that specifies items to be shipped prior to any items being loaded into the container; and
    modifying the user interface at the display device to indicate that the item is present and not itemized in the electronic shipping list.

6. The method of claim 5 further comprising:
    generating one or more notifications indicative of presence of one or more individual items not itemized in the electronic shipping list.

7. A non-transitory computer-readable medium storing computer-executable code for verifying individual items during loading into a container by a pickup worker of a shipper, the non-transitory computer-readable medium comprising:
    code for receiving an electronic shipping list associated with a shipment, wherein the electronic shipping list itemizes each of a plurality of individual items forming the shipment according to product type using at least a Global Trade Item Number (GTIN), wherein the electronic shipping list exists independently of a list of items loaded into a container, and wherein the electronic shipping list specifies items to be shipped prior to any items being loaded into the container;
    code for generating a user interface at a display device of the pickup worker that indicates individual items in the electronic shipping list are present in the container, at least one of the individual items in the electronic shipping list indicated to not be present in the container;
    code for receiving information read from a tag affixed to an item by one or more tag reading devices associated with the container in response to the pickup worker of the shipper loading the item into the container, wherein the information read comprises a unique identifier associated with the item;
    code for, in response to receiving the information read from the tag affixed to the item, decoding the unique identifier to obtain a Global Trade Item Number (GTIN) that uniquely identifies a product type of the item;
    code for determining, on an item by item basis, that the GTIN of the item matches the GTIN in the electronic shipping list of one of the at least one of the individual items indicated to not be present in the container; and
    code for modifying an inclusion status in the user interface at the display device to indicate that the one of the at least one of the individual items indicated to not be present in the container is present in the container.

8. The non-transitory computer-readable medium of claim 7 wherein the unique identifier is an Electronic Product Code (EPC) stored in the tag affixed to the item.

9. The non-transitory computer-readable medium of claim 7 further comprising:
    code for generating one or more notifications indicating that one or more individual items in the shipment are physically present.

10. The non-transitory computer-readable medium of claim 7 further comprising:
   code for generating one or more notifications indicating that one or more individual items in the shipment are not physically present.

11. The non-transitory computer-readable medium of claim 7 further comprising:
   code for determining, on an item by item basis, whether the GTIN of the item indicates presence of an item not itemized in the electronic shipping list associated with a shipment that specifies items to be shipped prior to any items being loaded into the container; and
   modifying the user interface at the display device to indicate that the item is present and not itemized in the electronic shipping list.

12. The non-transitory computer-readable medium of claim 11 further comprising:
   code for generating one or more notifications indicative of presence of one or more individual products not itemized in the electronic shipping list according to the decoded GTINs.

13. A system for verifying individual items during loading into a container by a pickup worker of a shipper, the system comprising:
   a hardware processor; and
   a non-transitory memory storing an electronic shipping list associated with a shipment, wherein the electronic shipping list itemizes each of a plurality of individual items forming the shipment according to product type using at least a Global Trade Item Number (GTIN), wherein the electronic shipping list exists independently of a list of items loaded into a container, and wherein the electronic shipping list specifies items to be shipped prior to any items being loaded into the container,
   the memory further storing a set of instructions which when executed by the processor configure the processor to:
      generate a user interface at a display device the pickup worker loading the container that indicates whether individual items in the electronic shipping list are present in the container, at least one of the individual items in the electronic shipping list indicated to not be present in the container;
      receive information read from a tag affixed to an item by one or more tag reading devices associated with the container in response to the pickup worker of the shipper loading the item into the container, wherein the information read comprises a unique identifier associated with the item;
      in response to receiving the information read from the tag affixed to the item, decode the unique identifier to obtain a Global Trade Item Number (GTIN) that uniquely identifies a product type of the item;
      determine, on an item by item basis, that the GTIN of the item matches the GTIN in the electronic shipping list of one of the at least one of the individual items indicated to not be present in the container; and
      modify the user interface at the display device to indicate that the one of the at least one of the individual items indicated to not be present in the container is present in the container.

14. The system of claim 13 wherein the unique identifier is an Electronic Product Code (EPC) stored in the tag affixed to the item.

15. The system of claim 13 wherein the processor is further configured to generate one or more notifications indicating that one or more individual items in the shipment are physically present.

16. The system of claim 13 wherein the processor is further configured to generate one or more notifications indicating that one or more individual items in the shipment are not physically present.

17. The system of claim 13 wherein the processor is further configured to determine, on an item by item basis, whether the GTIN of the item indicates presence of an item not itemized in the electronic shipping list associated with a shipment that specifies items to be shipped prior to any items being loaded into the container; and
   code to modify the user interface at the display device to indicate that the item is present and not itemized in the electronic shipping list.

18. The system of claim 17 wherein the processor is further configured to generate one or more notifications indicative of presence of one or more individual products not itemized in the electronic shipping list according to the decoded GTINs.

* * * * *